United States Patent
Tilfors et al.

(10) Patent No.: US 11,921,727 B2
(45) Date of Patent: Mar. 5, 2024

(54) SYSTEMS AND METHODS OF CONDITIONAL SEARCH TECHNIQUES

(71) Applicant: NASDAQ TECHNOLOGY AB, Stockholm (SE)

(72) Inventors: Jan Tilfors, Stockholm (SE); Robert Adolfsson, Vega (SE); Michael Craig, Wayne, NJ (US)

(73) Assignee: NASDAQ TECHNOLOGY AB, Stockholm (SE)

( * ) Notice: Subject to any disclaimer, the term of this patent is extended or adjusted under 35 U.S.C. 154(b) by 0 days.

(21) Appl. No.: 17/656,860

(22) Filed: Mar. 28, 2022

(65) Prior Publication Data

US 2022/0309060 A1  Sep. 29, 2022

Related U.S. Application Data

(60) Provisional application No. 63/167,513, filed on Mar. 29, 2021.

(51) Int. Cl.
*G06F 16/00* (2019.01)
*G06F 16/2457* (2019.01)
*G06F 16/248* (2019.01)

(52) U.S. Cl.
CPC ........ *G06F 16/2457* (2019.01); *G06F 16/248* (2019.01)

(58) Field of Classification Search
CPC ............................ G06F 16/2457; G06F 16/248
USPC .................................................. 707/600–899
See application file for complete search history.

(56) References Cited

U.S. PATENT DOCUMENTS

| | | | | |
|---|---|---|---|---|
| 9,336,333 | B2* | 5/2016 | Blue | G06F 16/951 |
| 2009/0083220 | A1* | 3/2009 | Petri | G06F 16/93 |
| | | | | 707/999.009 |
| 2009/0125482 | A1 | 5/2009 | Peregrine et al. | |
| 2010/0250578 | A1* | 9/2010 | Athsani | G06Q 30/0256 |
| | | | | 707/765 |
| 2011/0252463 | A1* | 10/2011 | Yeleshwarapu | G06Q 10/00 |
| | | | | 707/723 |
| 2012/0030228 | A1* | 2/2012 | Naidu | G06F 16/951 |
| | | | | 707/767 |
| 2014/0280063 | A1* | 9/2014 | Sen | G06F 16/338 |
| | | | | 707/722 |
| 2014/0280292 | A1* | 9/2014 | Skinder | G06F 16/24534 |
| | | | | 707/767 |
| 2018/0025089 | A1* | 1/2018 | Chin | G06F 16/9535 |
| | | | | 707/706 |
| 2020/0005134 | A1* | 1/2020 | Ramanath | G06N 3/045 |
| 2020/0183960 | A1* | 6/2020 | Sharafi | G06F 16/3334 |

OTHER PUBLICATIONS

International Search Report for Application No. PCT/EP2022/058219, four pages, dated Aug. 12, 2022.
Written Opinion of the ISA for Application No. PCT/EP2022/058219, six pages, dated Aug. 12, 2022.

\* cited by examiner

*Primary Examiner* — Michelle N Owyang
(74) *Attorney, Agent, or Firm* — Nixon & Vanderhye P.C.

(57) ABSTRACT

A computer is provided that includes a search engine. The search engine is configured to receive a search request and conduct a search against a database. Each record within the database includes or is associated with a display criteria or profile that specifies when data from that record can be included into a response to a search.

20 Claims, 11 Drawing Sheets

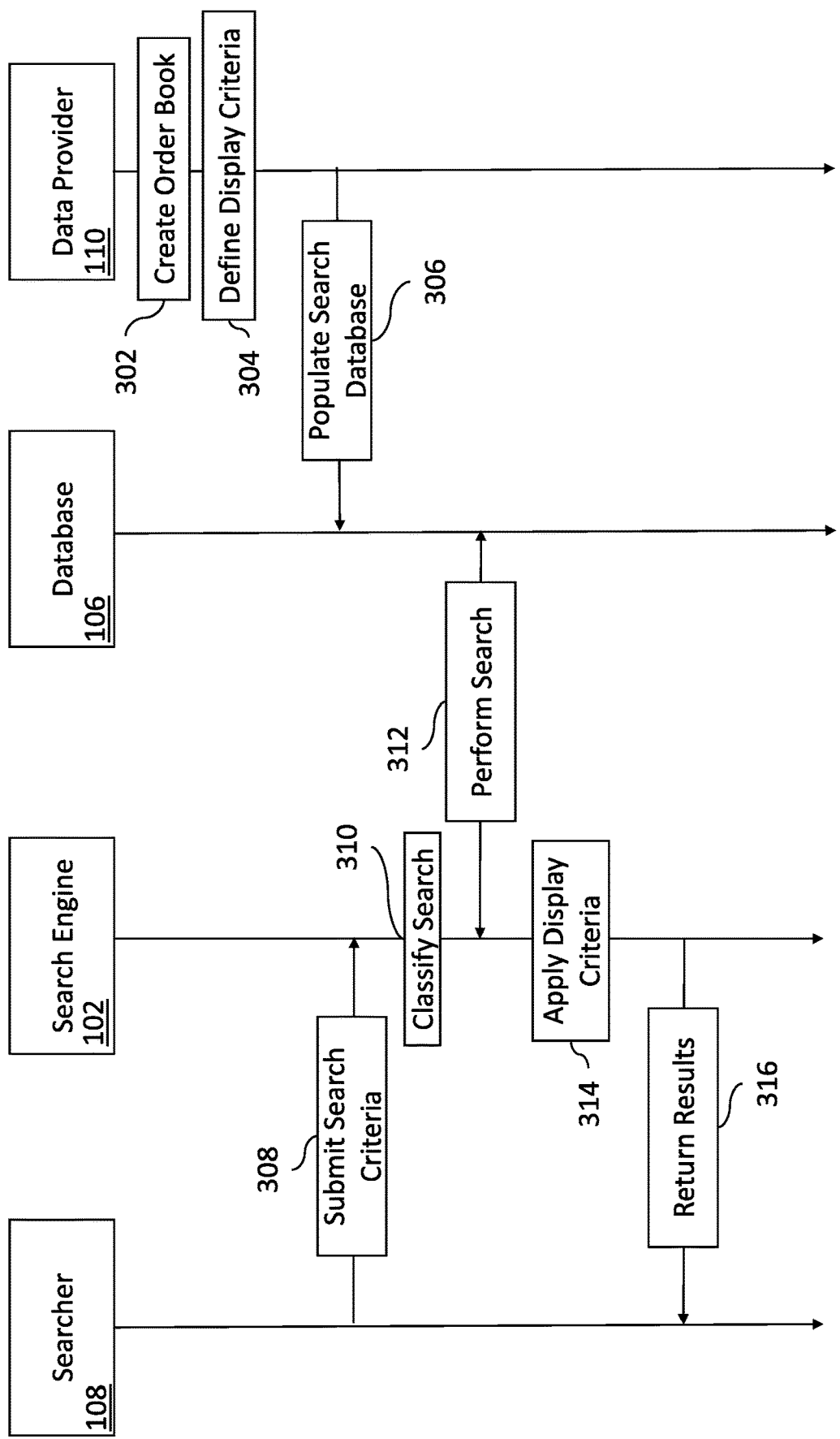

| | Search Type | Response Type | Display Criteria | | |
|---|---|---|---|---|---|
| | | | Mirror Search (Take all attributes form the search) | Intersection of Attributes, Mirroring of Parameters (Show the exact values of the attributes searched for, none for the others) | Reveal All Attributes, Mirroring of Parameters (Reveal all, including those that were not searched for) |
| Single ISIN OB | High Level Search | High Level Response | | | |
| | ISIN Search | ISIN Response | ISIN Only | ISIN+Yield | ISIN+Volume |
| | | Firm Response | ISIN+Yield+Volume | | |
| | | ISIN Response | Mirror Search (Only send Volume and Yield back if this was part of the query) | Mirror Search+Price | Mirror Search+Volume |
| | | Firm Response | ISIN+Price+Volume | | |
| | Firm Search | Firm Response | ISIN+Price+Volume | | |
| | High Level Search | High Level Response | Mirror Search | Intersection of Attributes and Parameters (Show the intersection of the ranges of the attributes/parameters searched for, none for the others) | Reveal all attributes and Parameters (Reveal all attributes/parameters on the order book, including those not searched for) |
| High Level OB | ISIN Search | High Level Response | Intersection of Parameters and Reveal Attributes | Reveal all Attributes and Parameters | |

Fig. 4

SYSTEMS AND METHODS OF CONDITIONAL SEARCH TECHNIQUES

CROSS REFERENCE(S) TO RELATED APPLICATION(S)

This application claims priority to U.S. Provisional Application No. 63/167,513, filed Mar. 29, 2021, the entire contents of which are hereby incorporated by reference.

TECHNICAL OVERVIEW

The technology described herein relates to search techniques and search engines. More particularly, the technology described herein relates to generating or displaying different (e.g., conditional) responses based on the nature of a search request (or the participant performing the request).

INTRODUCTION

Search engines are an important tool in modern society due to the increasing amount of data that is available for consumption. They provide an interface for sifting through the vast amount of data that is available. From images, news articles, documents on a computer, and other electronic data, search engines help retrieve relevant data for users, computer processes, and the like. Accordingly, it will be appreciated that new and improved techniques, systems, and processes are continually sought after—particularly in the field of search techniques and search engines.

SUMMARY

A computer is provided that includes a search engine. The search engine is configured to receive a search request and conduct a search against a database. Each record within the database includes a display criteria parameter that specifies when data from that record can be included into a response to a search. The search engine takes the search criteria from the search request and conducts a search to retrieve one or more results from the database. The display criteria of each returned record is then applied to determine whether the record should be included in the responsive search data and, if so, what data should be included in the response. The providers of the data can control how or when their data is presented to search requesters based on the nature of the submitted search request.

For example, a record may indicate that it is not be included when the search request is generic or broad. In another example, the data in the search response may be adjusted to only provide data from a record based on the search criteria. Thus, if a value is provided for field A, but not field B in a search request, then the value of field A from a record may be included in the response but not from field B. As another example, if a more specific search request is received, then the response may include all of the data from the record in the search response.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 3 is a signal diagram showing how the elements shown in FIG. 1 communicate and operate with one another;

FIG. 4 is a table showing different example display criteria according to certain example embodiments;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

In certain example embodiments, a search engine is provided for handling conditional search responses on a computer system. The search engine operates against a database of records. Each record within the database includes data items or attributes that are specific to that record. Each record may also have (or be associated with) a corresponding display criteria for when that corresponding record should be included in search results (e.g., when the record should be displayed within a given search result) and/or what type of data (e.g., of the multiple attributes from the records) should be included in the search results. The search engine takes search criteria received from a search participant and performs a search against the records in the database based on criteria. The results of the search are then processed to account for the display criteria and a search result is generated as returned to the user.

Figure 1:
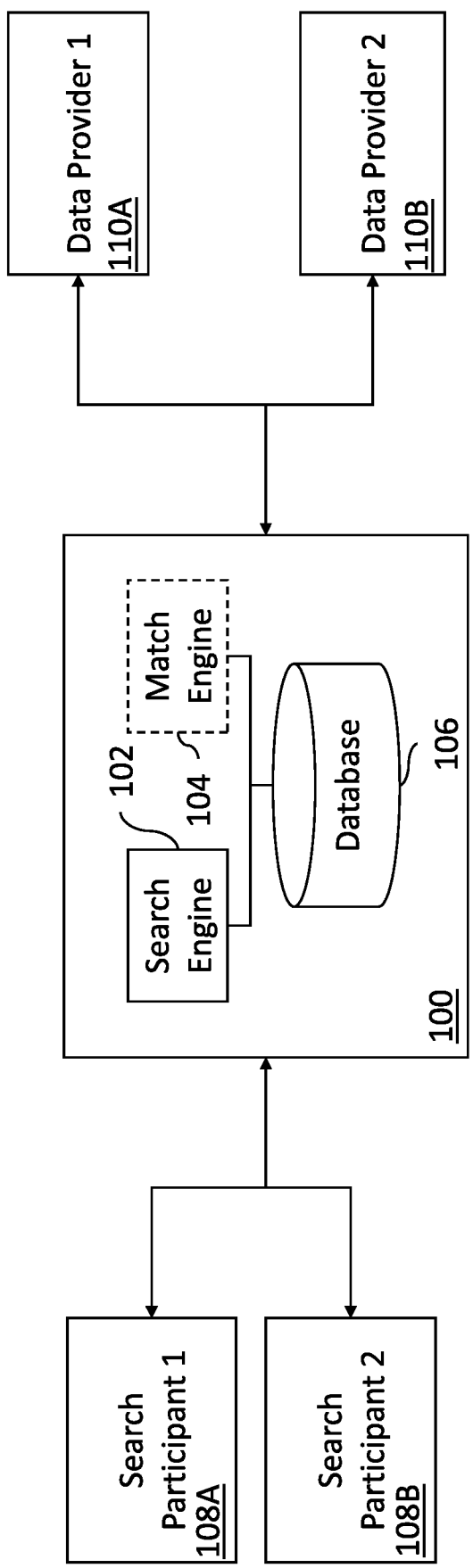
FIG. 1 is a diagram of an example computer system that receives search requests and uses a search engine to conduct electronic searches of one or more datasets.
Figure 5:
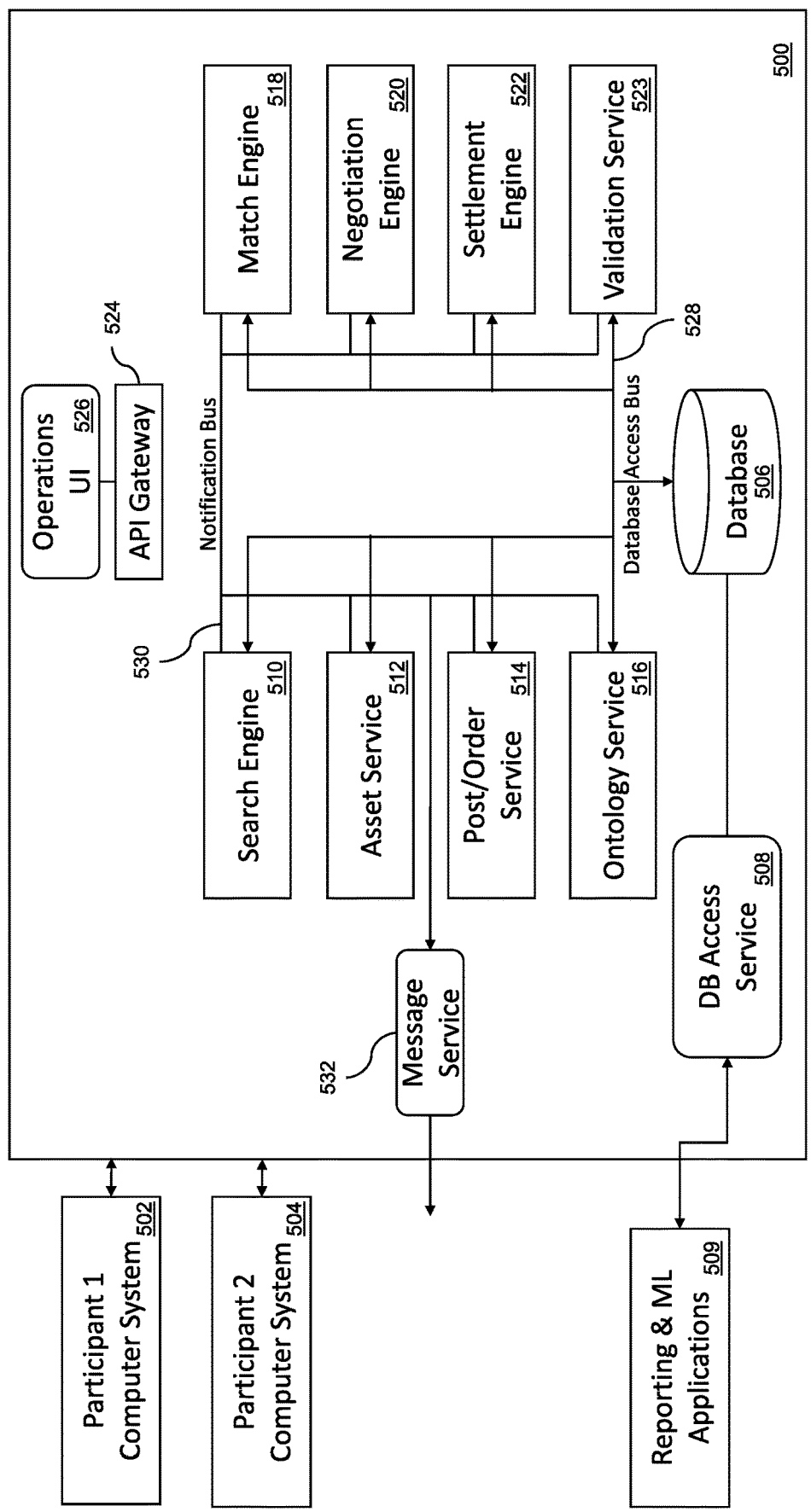
FIG. 5 is a diagram of an example computer system that receives search requests and uses a search engine to conduct electronic searches.

Some embodiments described herein relate to distributed computing systems and techniques for implementing distributed processing on such systems (e.g., in connection with the systems discussed in FIG. 1 or 5). In particular, this specification describes a distributed computing system that includes various modules, services, or engines that may each be implemented within their own processing instance of such a distributed computing system.

Examples of distributed computing systems include telecommunication networks, payment processing systems, industrial control systems, parallel scientific computation systems, distributed databases, blockchain-based smart contracts systems, search services, electronic trading platforms, and others. Many distributed computing systems are configured to process messages that they receive. In particular, many distributed computing systems are configured to receive and process data transaction requests and other types of requests, which specify in some fashion operations for the distributed computing system to perform (or, in some instances, to perform upon the satisfaction of certain conditions). As an example, a parallel scientific computation system may receive a data transaction request that specifies some operations to be performed in parallel. As another example, a distributed database system may receive a data transaction request that specifies a data operation (e.g. the addition, update, or removal of some data) that should be performed on the data store managed by the database system. As another example, a distributed computer system may receive different search requests that are then performed against a search database. In such a distributed environment, processing that is performed is often handled by different ones of the processing instances that are within the overall distributed computing system.

In many places in this document, including but not limited to in the description of FIGS. 1 and 5, software modules (e.g., search engines, match engines, etc.) and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 9.

Figure 2:
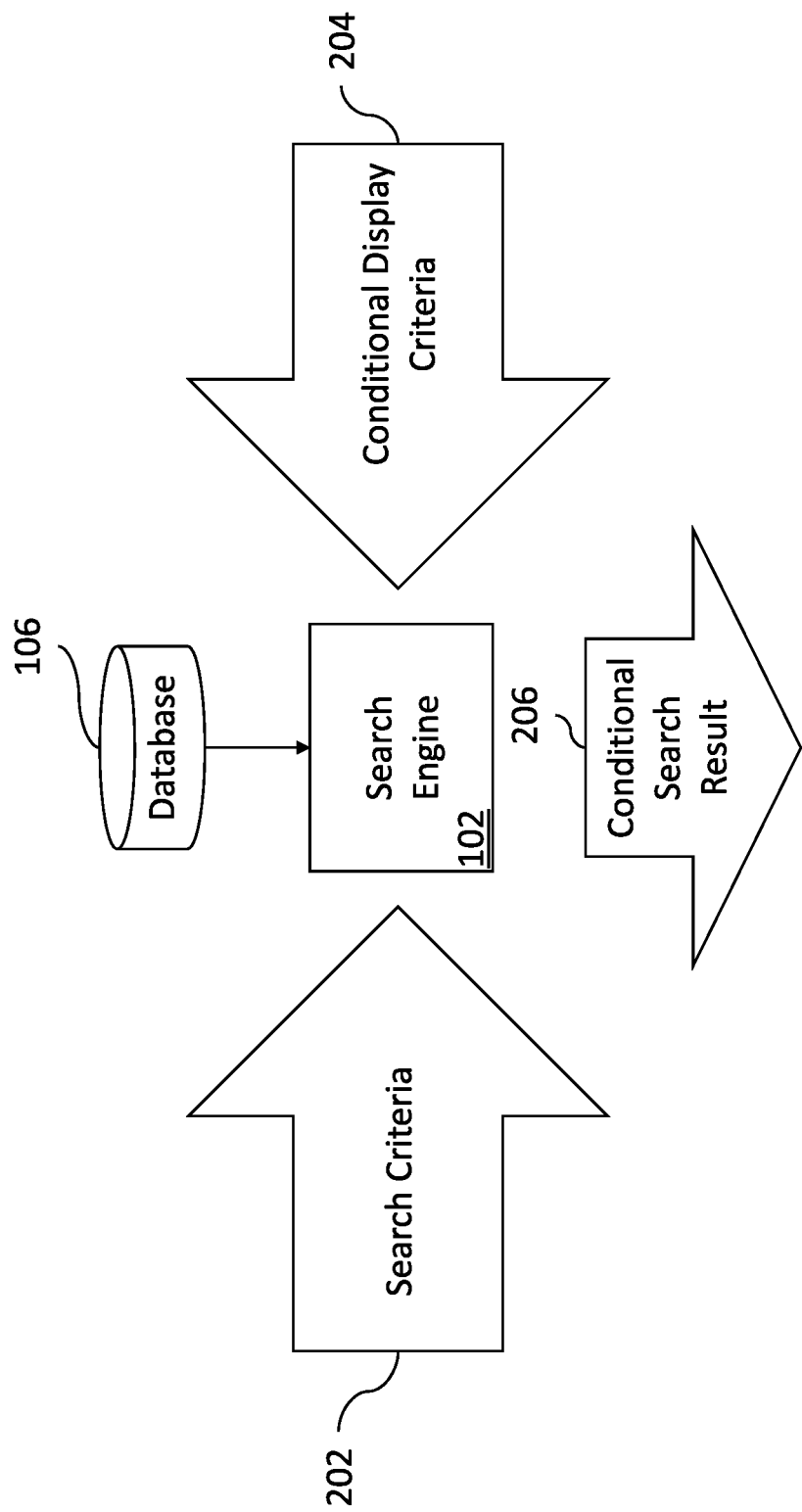
FIG. 2 is an illustrative view of how conditional search results are generated according to certain example embodiments.

Description of FIGS. 1 and 2

FIG. 1 is a diagram of an example computer system 100 that receives search requests and uses a search engine 102 to conduct electronic searches against one or more datasets that are stored in database 106. FIG. 2 is an illustrative view of how conditional search results are generated according to certain example embodiments.

An example of computer system 100 includes computing device 900, which is described in connection with FIG. 9. In certain examples, computer system 100 is comprised of multiple different instances of computing device 900 that communicate with each other. Accordingly, computer system 100 may be a distributed computer system in certain example embodiments. In certain example embodiments, computer system 100 may be implemented on a cloud based computing environment and any or all of the processing elements discussed herein (e.g., search engine 102) may be executed within a virtual environment (e.g., a virtual machine or virtual container, such as virtual containers created and/or managed by Kubernetes or the like). In certain examples, different instances of computing device 900 that are part of computer system 100 may be controlled or operated by different entities. For example, some may be operated by data provider 1, some by search participant 1, some by a third party, and some by a governmental organization (e.g., a regulatory agency).

Computer system 100 includes a search engine 102, a database 106, and, optionally, a match engine 104. Computer system 100 communicates with different external computer systems that may include computing systems 108A, 108B, 110A, and 110B. Computing systems 108A and 108B respectively correspond to different search participants that interface with computer system 100. The different search participants submit search queries to computer system 100 that are then processed by search engine 102. The results of the search performed by search engine 102 are provided back to the computing systems 108A/108B.

Computer systems 110A and 110B are computer systems operated by data providers. Data providers may provide both the data that is of interest to the searching participants and the criteria, metadata, or parameters for how results may be generated or filtered in response to search requests from searching participants.

For example, such computer systems may be operated by organizations that are offering resources for matching or trading. The resources may vary from collections of images (whether physical or digital), health data of patients of a hospital (e.g., to use in medical studies), cars, animals (e.g., dogs and cats) for adoption, securities (e.g., bonds, etc.).

As discussed in greater detail below, each resource may be defined or described by a data provider by using an order book. Notably, in certain examples, the "resource" that is described by the order book is not included in the order book. For example, the resource may be oil or cars. In another example, the resource may be a collection of 500 images. The order may use various attributes to describe this collection, but the order book would not actually include the images within the order book. In certain alternative example embodiments, in the case of trading in digital data, the data itself may be included in the order book. In any event, the data providers transmit data regarding their individual order books that they generate to computer system 100 that stores this information within database 106 for access and use by search engine 102.

In alternative embodiments, each computing system 110A, 110B may be included as part of computing system 100. For example, the database 106 may be distributed (e.g., among computing system 100, 110A, and 110B) and requests for data (e.g., by search engine 102) may result in querying one or more data providers for data that is relevant to the search that is being processed by the search engine 102. In certain example embodiments, computing system 100 may also provide the functionality of a data provider.

Database 106 is stored in electronic memory (e.g., cache memory, RAM, non-volatile memory, and/or other types of a storage and/or combinations thereof) and may include different types of storage techniques for organizing and storing data. Database 106 may include storing the data in a flat file(s) or storing the data into a relational or object oriented database or other organized structure.

In certain example embodiments, database 106 may include different records that each specify the attributes of different order books that have been generated by the data providers. Each record may be a copy of a corresponding generated order book or may include the searchable attributes of the corresponding order book. In other words, each data provider may independently determine what attributes regarding the generated order books to provide to the computing system 100 for storage into database 106 for searching by the search engine 102. In general, these records are diverse in nature and thus may not all have a value for a given parameter (e.g., the value may be null). An example of a record may be attributes on a bond that is being offered. This record may specify a price and/or yield and a quantity. In another example, the record may relate to aggregated health data (e.g., that could be used in a clinical study). In this case, the record may include the age range of the patients, and/or other health related information for that health data.

Figure 6:
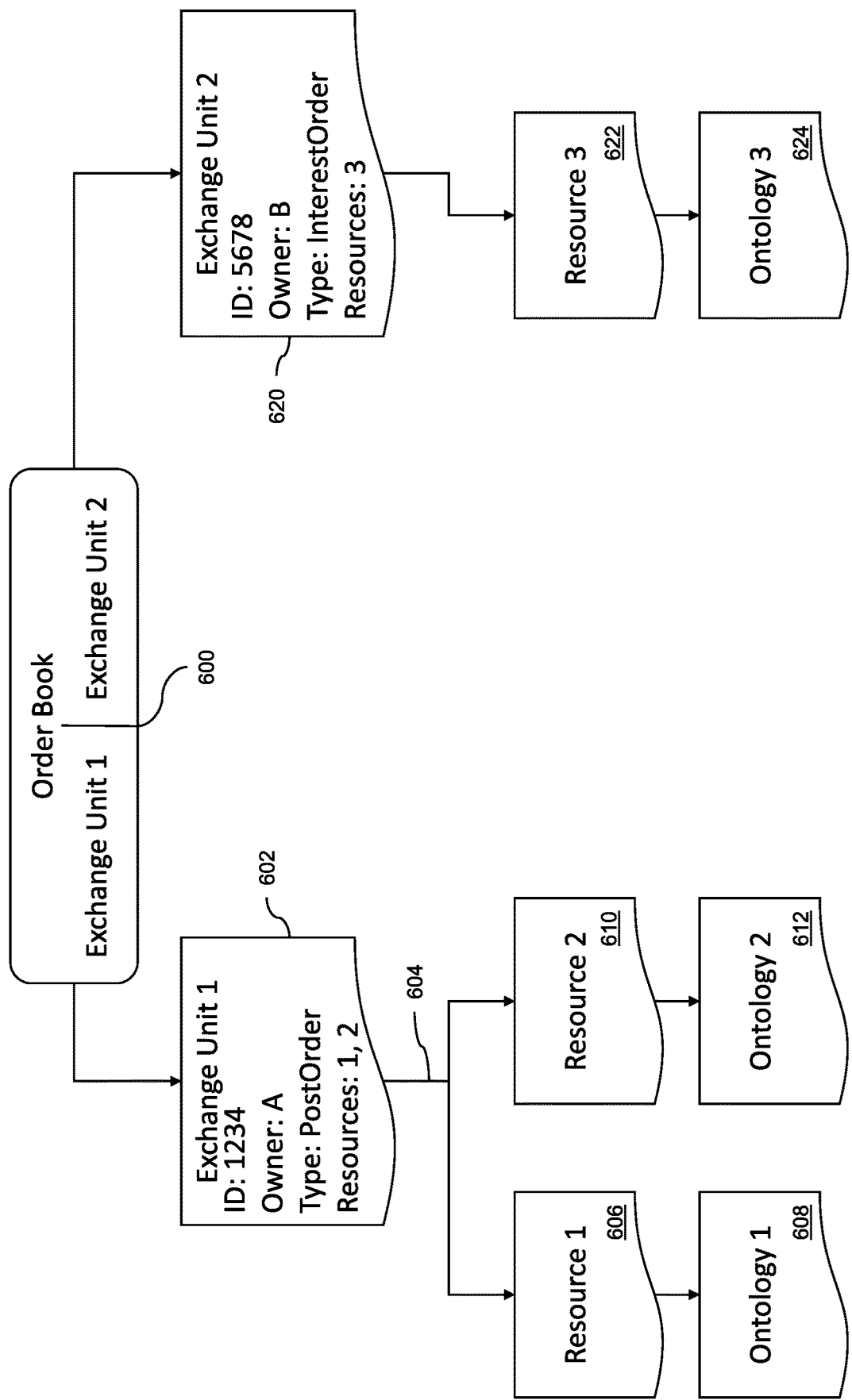
FIGS. 6-7C are diagrams of how aspects of a data model that may be used in connection with certain example embodiments.

Order books are a type of data structure and generally include at least one list (e.g., one or more items) of electronic data messages (e.g., orders). Each list may be sorted (either dynamically or as new items are added or removed) based on one or more factors. For example, the lists may be sorted by using price/time technique (e.g., based on a price parameter included in the message and/or when the message was received) or other ordering technique. Each order book may be divided into two sides—side x and side y (e.g., as shown in FIG. 6), which may be buy and sell sides. Each of the sides may be stored or sorted using the same or different criteria.

In certain examples, each order book handles orders for instances of a resource that are interchangeable with each other. For example, if the resource is for Apple stock, an individual instance of that resource may be 1 share of Apple stock (with each share being interchangeable with other shares). Accordingly, each order that is included within an order book may indicate different instances of the resource to which the order book pertains.

Order books that are defined by the data providers are generally unique with respect to other order books (either unique per data provider or unique across data providers). Each resource that is defined by an order book may be associated with a GUID. For example, in the case of the resource being an instrument or security, it may be specified by an International Securities Identifying Number (ISIN), which can serve as a default identity for a given order book. In certain examples, multiple different data providers may host their own order books for the same ISIN. In certain example embodiments, the order books may be identified from a combination (e.g., concatenation) of a participant ID (e.g., for the specific data provider) and the ISIN.

In certain example embodiments, the "owner" of an order book (e.g., the data provider that created it) may only have one order per order book. Accordingly, the properties of one may be applied to the other (as there is a maintained 1-to-1 relationship). Thus, as used herein, the properties of an "order book" may be associated with the single order that a data provider adds to that order (and vice versa). For example, the display criteria that is discussed herein may be associated with the order book and/or the order that is added to that book.

In certain example embodiments, other data providers or other participants may add orders to the order book. In certain example embodiments, if the order book owner is a seller, then no other sellers may list orders (e.g., only buy orders may be added). Conversely, if the order book owner is a buyer, then no other buy orders may be added. Orders that are added to order books may be firm or indicative.

In certain example embodiments, each order book owner (e.g., data provider) controls their own order book and may perform any or all of the following actions on the order book. Order(s) can be inserted and maintained. Counterparty orders can be rejected or removed. In such cases, the counterparty may be notified. A counterpart order may be moved to flagged for negotiation. For example, a received counter party order may be moved over to a negotiation process (which may occur in an automated fashion, a semi-automated fashion, or manually). When an order is moved to a negotiation phase, it may be removed from the book. Orders from the order book may be deleted (note that if there is a pending negotiation the deletion process may wait until the negotiation is complete).

Generated order books may have the following states. Closed where the order book exists but is not visible to other participants. This may be the default state when an order book is created. The order book owner can manage the order in state closed. The state can also be used if the participant is not available. In certain examples, if there are other participant orders in the order book and the state is changed to closed, the other orders are removed. In an open state all functionality turned on and orders (and the order book) are visible to the search engine 102. In a halted state the order book is visible in search and third party participants can delete orders. Also, firm orders can match. If an order book is moved to the halted state all orders in the order book may remain. This state may be used to show that the order book owner is away for a short while and can be useful for when manual negotiation is required.

In certain example embodiments, data providers can also perform the following functions for their order books: 1) Halt a specific order book (orders remain in the halted order book); 2) Halt all order books (all order books of the data providers are halted, with orders remaining in the respective order books); 3) Close all order books (but pending order remain in the order books); 4) Close a specific order book (Orders remain in the order book); 5) Open all order books (e.g., from closed or halted); 6) Open a specific order book (e.g., from closed or halted). In the case of an automated exchange environment, the order books may automatically move to closed at the end of a trading day. In certain instances, the orders books may automatically open at the beginning or may be manually moved to open.

Orders added to order books by a data provider also may have a format. The following are example data fields that may be used for orders for order books configured to handle securities (e.g., bonds) that may be offered by data providers: 1) order book ID (the order book that this order is associated with); 2) Buy/Sell (e.g., whether the order is buy or sell order); 3) Instrument details including: a) ISIN and/or Instrument attributes. Instrument attributes may include: 1) maturity (can be a range such as 2-4 years); 2) yield (can be a range such as 2-3%); 3) sector (one or more sectors may be specified in an array or list); 4) issuer (one or more issuers may be specified in an array or list); 5) country (one or more countries may be specified in an array or list); 6) currency (e.g., single value such as USD or Euro); 7) rating (can be a range such as 4-5). In certain examples, if instrument attributes are used then there may be a requirement to specify at least, for example, 3 different attributes. Thus some attributes may be null while others are used. In certain examples, specifying a specific one of the attributes (or data fields) may trigger a requirement that another attribute or data field is also specified. Thus, for example, a requirement may be that if country is specified, the currency must be specified as well. Additional example data fields may include: 3) quantity; 4) price; 5) yield—if a price is specified for single ISIN order, then the yield will be calculated; 6) whether a firm or indicative order; 7) auto negotiation allowed (Y/N) where any incoming order is automatically moved into a negotiation phase; 8) Anonymous orders allowed (Y/N) (e.g., can incoming orders be associated with an anonymous counter party (from the perspective of the data provider)?); 9) RFQ search auto response (Y/N) details if the order should be sent as a indicative order when a search does an RFQ search and the two orders match; 10) RFQ auto response (Y/N) if the order book can send automated response to RFQ (If set to Yes the order will be sent as a firm order); 11) Visibility of the order; 12) Minimum executable quantity; and 13) search conditions.

Visibility of an order may be based on one or more of the following options: Limited list with conditions (disclosed); Whole market with conditions (anonymous); Whole market (disclosed to list and anonymous to wide market) with conditions). As discussed herein, if a search specifies the unique ID associated with an order book (e.g., the ISIN(s) for a specific order book), then the attributes for that ID may be generated and returned to the user (e.g., from the above stored reference data). However, if the user specifies instrument attributes, then there may be a requirement that at least the 3 attributes be specified because ISINs are generated that match the criteria (e.g., just searching on 6% yield instruments may not return results (or all of the possible results).

Just as there may be requirements for what fields to include for an order from a data provider, orders from searchers (e.g., after the search results are received) may also include data fields. Such orders may include any or all of the following: 1) Order book identity (e.g., the ID); 2) Buy/Sell; 3) Quantity (which may be blank for indicative orders); 4) Price (which can be blank for indicative orders); 5) whether the order is firm or indicative; 6) Minimum executable quantity; 7) Visibility of the order. The visibility of the order may be completely anonymous (e.g., the submitting participant is anonymous to the data provider). Alternatively, the visibility may be based off of a limited list where, if the data provider identity is revealed and the order book owner's identity is on the submitters visibility list, then the submitters participant's id is revealed. In this case the participant id will be added into the submitted order. In certain example embodiments, alternative values for one or more fields may be specified by a submitter. For example, the following fields may be altered with a single value: 1) Maturity; 2) Yield; 3) Sector; 4) Issuer; 5) Country; 6) Currency; 7) Rating.

In certain example embodiments, when an order is sent to another order book, the participant also has the option to create their own order book for that same order. In this case, further order information may be provided (e.g., as discussed above). Thus, a searcher (or order submitter) may also be a data provider as discussed herein.

As discussed in greater detailed herein, each order, each order book, and/or each side of an order book may include or be associated with display criteria that is used to determine whether a given piece of data (e.g., an order book and all records of an order book, all records on a side of a multi-sided order book, or each order) is to be included within the results of a performed search process.

When a data provider (e.g. the owner of an order book) generates an order (or creates the book), the data provider may also define a display criteria. In certain examples, the default display option will result in the order being displayed in a search with its order parameters if it is relevant to a processed search query. Display criteria can be used by an order book owner to control what information (regarding the order book or order(s) therein) to reveal to a searcher.

In certain example embodiments, there may be multiple different display strategies or options for a data provider to choose from. In certain examples, new display strategies may be added to the system to provide for additional alternatives. Different examples of how the display strategies may be implemented are discussed below, with an example shown in FIG. 4.

Returning to FIG. 1, search engine 102 and match engine 104 may be software executed on one or more hardware processors (e.g., processors 902 of a processing system) that are programmed or configured through the software. In certain examples, the search engine 102 and/or matching engine 104 may be implemented by one or more ASICs or other specific hardware.

The functionality provided by the search engine 102 is shown in FIG. 2 and operates by processing search criteria 202 (e.g., provided by a search participant and discussed in greater detail below in connection with FIG. 3) in combination with the conditional display criteria 204 (e.g., provided by a data provider and discussed in greater detail below in connection with FIG. 3). The search engine 102 uses these two inputs to search the database 106 to generate search results that are returned as conditional search result 206 to the search submitter. The conditional search results 206 may be, for example, a list of results from the database 106 that: 1) satisfy the search criteria; and 2) pass the conditional display criteria for the records that have been retrieved.

Search engine 102 performs searches, based on received search requests, of the records within the database 106. In certain example embodiments, the display criteria for orders and/or order books is accounted for in the conducted search. In other examples, when a search is conducted and once the records are retrieved based on the performed search, the search engine then executes a logical test on the results to generate the results that are returned to the searcher. The logical test that is executed is based on the previously set display criteria. In other words, the search is performed based on the attributes in the search request to retrieve all of the records that are relevant to the search. Then, the search engine 102 performs a filtering of those records to account for the defined display criteria.

As discussed below, different attributes can be processed by the search engine in connection with performing a logical test to determine whether a given record is to be included in the results. For example, the logical test may take into account attributes of the searcher (e.g., what type of industry they are in), attributes of the search (e.g., the specificity of the search—whether they are looking for images of dogs or images of German Shepherds). The logical test may, in certain example embodiments, be viewed as a filter that is executed on the retrieved search results. After processing by the logical test process, the results are returned to the search participant.

In certain example embodiments, computer system 100 may function or act as an automated exchange computer system that processes data transaction requests (e.g., orders, PostOrders, InterestOrders, etc.). Certain examples discussed herein relate to implementation of search techniques for use in automated exchanges. For example, data providers may provide order books and/or orders for those order books. In such cases, the automated exchange computer system may include a match engine 104 that is used to match data transaction requests that are submitted from to the computer system 100 against data transaction requests that are pending (e.g., within an order book that is controlled by a data provider). As discussed herein, the matching process may involve a negotiation process that is handled by the data provider.

Match engine 104 operates by processing data transaction requests (sometime called orders or electronic orders herein). Upon receiving a data transaction request, the match engine 106 determines the type of data transaction request (e.g., whether a buy order or a sell order). Responsive to this determination, match engine 106 attempts to match the incoming data transaction request to a pending or resting data transaction request.

Description of FIG. 3

FIG. 3 is a signal diagram showing how the system shown in FIG. 1 may implement the process shown in FIG. 2.

At 302, data provider 110 creates an order book (or orders for an order book). This includes defining the attributes for the order book and/or the order that is created therein.

At 304, the data provider also defines the display criteria for how the order and/or order book responds to searches that are to be conducted by the search engine 102.

At 306, database 106 is populated by data provider 110 with the information regarding the created order book and/or order. For example, by specifying the relevant attributes for the order book and/or order.

At 308, searcher 108 submits search criteria to computer system 100. The details of the search criteria may be different depending on particular application needs. In certain examples, the search criteria may include different logical statements (e.g., =, #, >, <, . . . ) and different kinds of values (BLANK, NULL, etc.). The following is an example set of criteria that may be specified in connection with an example system where data providers offer order books for bonds. The search may specify a unique order book identity (e.g., an ISIN ID with a participant ID). The search may specify whether they are looking to buy or sell (this field may be mandatory in certain examples). The search may specify instrument related parameters including an ISIN or attributes of an instrument. For example, 1) maturity (can be a range such as 2-4 years); 2) yield (can be a range such as 2-3%); 3) sector (one or more sectors may be specified in an array or list); 4) issuer (one or more issuers may be specified in an array or list); 5) country (one or more countries may be specified in an array or list); 6) currency (e.g., single value such as USD or Euro); and/or 7) rating (can be a range such as 4-5).

Another criteria may be quantity. Price may be another value that can be specified. In the case of price, a price may be specified if a single ISIN search is performed. Alternatively, a yield parameter may be specified for a search where the instrument is specified by attributes (as opposed to ISIN). In certain example embodiments, if a specific parameter is indicated, the system may also require a secondary parameter to be included. For example, if quantity is indicated, then currency may be required. In certain examples, the entered values may be validated and if the value is invalid, a warning may be sent to the user.

When a search is submitted by a searcher, additional data about the searcher may automatically be attached to the search request. For example, a marketplace ranking for the participant. In certain examples, a participant type may be specified (e.g., if they are hedge fund, a bank or a publically traded company).

In certain example embodiments, data that is included in search criteria (either that is added by the system 100 automatically or by the searcher) can be divided into participant data, asset data (e.g., related to an order book), and order data. Participant data may include, for example, a specific participant ID, a participant type (e.g., and end client, member type, whether a broker, and other parameters that may change based on industry). Participant data may also include credit rating information, ratings (e.g., a market wide rating), personal rating (e.g., by company or individual), bilateral credit risk, counterparty size requirement, where they are located (e.g., jurisdiction, the location of the asset in the case of selling), etc.

Order data may include, for example, B/S, a price range (or specific price), a volume range (or specific volume), and other parameters that may vary by specific market. Naturally, many fields may be left blank. In certain examples, the number of blank fields (or specific blank fields) may be used to determine what information to display to the searcher in response to a search.

At 310, the search that has been submitted by the searcher 108 is classified into one of multiple different types. This classification may be based on the nature of the search and/or the nature of the searcher (e.g., the data that is added regarding who is doing the searching). Example types of searches are shown in FIG. 4.

At 312, the search criteria is processed by search engine 102 to perform a search against database 106. In certain example embodiments, the search may be performed as follows. The search engine may use the visibility parameters of the owners of the orders/order books. In the case of a single ISIN search, the price used in the search may be specified by reference data for the ISIN. If price is used it will use price when searching the attributes of the single order books in the database 106. Yield will be used when searching for the attributes of order books in database 106 where the instrument is specified by attributes. A search using instrument attributes is a strict. This means that if an attribute of an instrument is specified all search results will meet the specified criteria. For example, quantity >500. In certain examples, a search using single ISIN will result in direct matches with the ISIN (e.g., since all orders have a single ISIN or list of ISINs attached).

In certain example embodiments, the search may be stopped after x second (or milliseconds). Thus, for example, a timer may be started at the beginning of the search and, upon expiration of the timer, the search process may be stopped (e.g., even if the full extent of the database has not been searched). This may be helpful in cases where there are thousands or even millions of records to search through in the database. Such volumes may be made further complex when there are hundreds or thousands of different possible attributes.

In certain example embodiments, when a search includes a specific ISIN, then the search result will include a flag—"volume exist" (Y/N). The flag indicates if there are volumes available in a union of all distributed orders or not for the given ISIN.

At 314, the display criteria are then applied to the retrieved results. For example, if the search criteria and attributes associated with search do not satisfy the display criteria for a given record, then that record will not be included. In certain example embodiments, the processing in 310 and 312 may be performed within the main search step (e.g., the display criteria can be displayed while the search is occurring against database 106). Example display criteria is shown in FIG. 4.

At 316, the search results are returned to the searcher. This may include displaying the results in a UI to a user or otherwise providing the results in electronic form to computing systems 108. In certain example embodiments, if the search criteria uses instrument attributes, then the search result is based on the order attributes that have been specified. In certain example embodiments, the search results can be ranked. For example, if the search contains a single ISIN, then a direct match with that ISIN is ranked highest. If the search is performed using instrument attributes, then the sorting will be done according to a sorting criteria (e.g., by sorting by price, volume, etc.)

Description of FIG. 4—Examples of Display Options

FIG. 4 is a table showing different example display criteria and search types according to certain example embodiments.

The example shown in FIG. 4 shows two different types of order books: a high level order book and a single ISIN order book. In FIG. 4 example, there are three different types of searches. First, a high level order book search for an order book using instrument attributes. For example, an ISIN and one attribute is specified in a search. Second, a high level search using attributes as a search criteria. For example, one (or more) attributes is included in a search. Note that a specific order book (e.g., ISIN is not included in this type of search). This type of search is also the most general of the three. The third time of search is a firm search that includes ISIN, price, and volume.

Accordingly, for this example, when a search request is received it may be classified into one of these three different search types. This data is then used to determine what type of search results are returned to the searcher. It will be appreciated that other types of search "types" may be defined according to application needs. For example, a type of category may be defined based on the nature of the searcher. As noted herein, different ratings may be assigned to searches and this information may be appended upon submission of search request.

Also provided in the FIG. 4 example are different response types. These are generally divided into high level responses, ISIN responses, and firm responses.

Different types of display criteria may be selected depending on the response type. Different display criteria include a mirror search where all the attributes are taken from the search. Another display criteria is the intersection of attributes with the mirror of parameters. For this option, the exact values are shown of the attribute that is searched for, with none of the other (non-searched) for attributes being shown in the response. Another option is to reveal all attributes, and mirroring of parameters. This reveals all parameters, including those parameters not part of the search. Data providers may thus select display criteria like these (or may define different display criteria depending on application need).

Other display options include displaying the ISIN only, or the ISIN with yield/price or volume. A firm response may be selected to provide ISIN, Yield, and Volume (e.g., detailed information on the order that is in the order book created by the data provider).

In certain example embodiments, the display criteria may be applied according to a logical test (e.g., that is performed at step 314). The display criteria is a set of rules where the Order owner defines what to show depending on who the searcher is (e.g., data on the participant that requested the search) and the searcher's search question (e.g., what asset or order criteria they searched on). In certain examples, each record that that is returned from the performed search (e.g., it satisfies the requested search criteria) may be subjected to this logical test. Different logical tests may be used (e.g., =, <, >, etc.) and values may indicated as Null or blank. The following are example logical tests that may be used.

Example 1: Volume=If ((Search Volume=BLANK); BLANK, My Volume (Min)). Example 2: Volume=If ((Search Volume <10; My volume (Min); My volume (average)). Example 3: Volume=If ((Search Volume >100; My volume (Max 100); My volume (Average). Example 4: Price=If ((Search Price=BLANK); BLANK;). Example 5: Price=If ((Search Price >97; (My price=Search price+1); My price (average). Example 6: RESPONSE=If (PARTICIPANT ID=ABC); NO RESPONSE). Example 7: RESPONSE=If ((My Rating <4; NO RESPONSE). Example 8: ASSET ID=If ((Search Asset ID=Blank); (Parameter 1, Parameter2, Parameter 3); ISIN).

Naturally more complex logical tests may also be used according to different use cases. Each of the templates may be applied against multiple different records returned from a search and multiple templates may be applied against a given record.

Description of FIG. 5

FIG. 5 is a diagram of an example computer system 500 that receives search requests and uses a search engine to conduct electronic searches against a database. In some examples, computer system 500 may be a further example of computer system 100 that is shown in FIG. 1. In some examples, computer 500 may be implemented as a cloud computing environment.

Computer system 500 includes a number of different components including a search engine 510 (which may be the same or similar to search engine 102), asset service 512, post (or order) service 514, ontology service 516, match engine 518 (which may be the same or similar to match engine 104), negotiation engine 520, settlement engine 522, and validation service 522. Additional components included in computer system 500 may be database 506 and a corresponding database access service 508, an application programming interface (API) gateway 524, and an operations user interface (UI) 526. Computer system 500 includes a messaging service 532 that may be used to communicate with external computer systems such as participant computer systems 502 and 504. Computer systems 500, 502, and 504 may be implemented using computing device 900.

Computer system 500 may include at least two different messaging buses, which collectively are included in the electronic data network that is provided in computer system 500. A notification bus 530 is used to broadcast or otherwise notify components within the computer system regarding actions have been taken within computer system 500. In certain examples, notifications are generated (and communicated to any or all of the components of the computer system 500) when a new resource is stored within the database 506. This type of architecture allows other components to act upon the creation of a new resource, without having the expressly call or message a particular component for that information. Rather, each component may be responsible for acting upon that information via the notification bus 530. A message service 532 may be coupled to the notification bus and act to communicate messages to external systems. An example of such a message service may be SNS or SQS that are provided on AWS from Amazon or other similar messaging services that are provided via other cloud providers.

The database access bus 528 is used by certain components to access any of the data that is stored in database 506. For example, to perform queries or otherwise retrieve, insert, or update data that is stored within database 506.

In general, each of search engine 510, asset service 512, post/order service 514, and ontology service 516 may be external facing services that are designed to accept data transaction requests (e.g., from any of computer systems 502, 504, etc.) that are associated with that respective service. Certain components, such as match engine 518 or validation service 522, may not be directly externally accessible in certain example embodiments. Any or all of the components within computer system 500 may enable access via REST interfaces.

Description of the various components found in computer system 500 will now be provided.

Figure 7A:
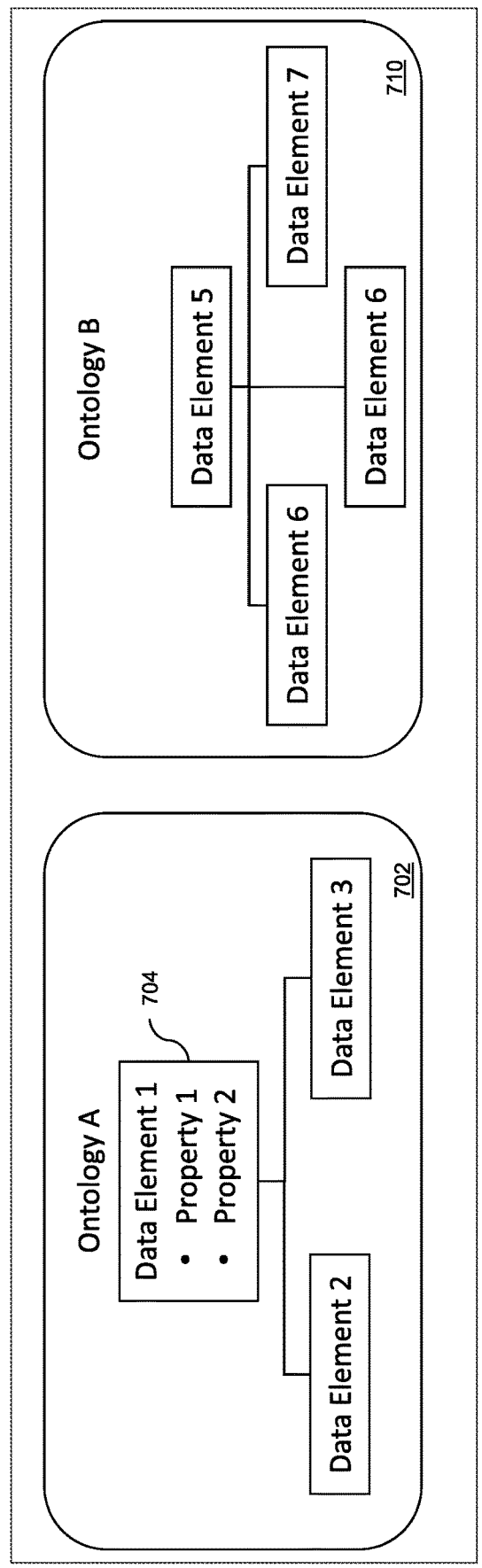

Ontology service 516 provides an access point for participants to submit, modify, or otherwise interact with the details of ontologies that can be used by resources within computer system 500. Details of ontologies are discussed in greater detail in connection with the data model described in FIGS. 6-7C. For example, by using ontology service 516, a participant may submit details to define ontology 702 that is shown in FIG. 7A.

Once one or more ontologies are defined, then participants may specify resources that comply with one of the ontologies via asset service 512. In some embodiments, the asset service 512 may be called a resource service that handles defining the properties of any resource that is stored within computer system 500. Different resources may include, in addition to asset resources, participant data (e.g., each participant or user may be a resource), display profile data (discussed below), a scheduling resource (e.g., that defines when different aspects are to occur—such as different quarters or semesters of a college degree), etc. In some examples, asset resources may include asset type, physical properties, location, quantity, and the like. When a resource is created for the computer system 500, it is assigned a reference ID and stored into database 506 (and notification via the notification bus 530 is then performed).

As noted above, one type of resource may be display profiles. These may be the same or similar to the display criteria that is discussed in connection with 304 in FIG. 3 or 204 in FIG. 2. Display profiles may be used by participants to define how PostOrders (e.g., submitted data transaction request(s)) may be evaluated in connection with received search requests (e.g., received via search engine 510). In general, display profiles may result in redaction of information regarding a given search (e.g., one or more properties of a given record are removed) or deletion of entire records from a result set. Participants may define display profiles and then later associate them when PostOrders are submitted (e.g., by referencing the resource ID of the display profile as part of the PostOrder). Display profiles may also be associated with PostOrders after or during creation of the PostOrder.

A display profile can include one or more display conditions or an algorithm that can evaluated at the time of a search request. As noted above, such algorithms can include logical expressions that can used to evaluate to true to false. Simple examples include "Do Not Display: By Location" or "Do Not Display: By Size". Other, more complex, algorithms may also be applied that rely on data about a participant (whether the searcher or submitter of the PostOrder) or any resource (or property thereof) of a PostOrder). A display profile may include any data needed to support the given algorithm. For example, the Do Not Display: By Location parameter/algorithm may require a parameter that specifies the locations to be excluded (e.g., cities, states, countries, etc.). Whereas the By Size attribute may relate to the size of the company (e.g., participant) performing the search.

In some examples, display profiles may name data elements from other resources (asset, user profile, and the like) and/or PostOrder parameters and specify logical expressions between them. If the logical expression evaluates true, then the data is redacted or deleted. Different levels of redaction may also be provided (e.g., as shown in FIG. 4 where certain display criteria display different types of information).

In some examples, multiple different display profiles may be applied to the same resource. For example, a participant may have a globally applicable display profile that applies to all PostOrders associated with that participant. The participant may then apply additional display profiles to individual PostOrder of that participant. In such circumstances, the display profiles may overlap. In such circumstances different approaches may be used including: 1) applying the narrower display profile (e.g., that is associated with the PostOrder specifically) but not the participant defined display profile; or 2) applying the participant display profile and then the PostOrder display profile, with one or the other controlling in case of conflict. In some examples, a display profile may indicate if it is exclusive to a given PostOrder or additive any other display profiles that may be applied to such a PostOrder. Other resolution options are also possible.

Returning to FIG. 5, order service 514 is used for accepting data transaction requests that define a PostOrder. In some embodiments, order service 514 may also accept accepting data transaction requests that define an InterestOrder. PostOrders are used by participants to offer a resource that another participant can search and/or potentially match against (e.g., by using an InterestOrder). A PostOrder may include: 1) a unique identifier for this new post order; 2) a list of resource reference identifiers that identify the resource (s) (e.g., such as an asset) that are to be included in that PostOrder; 3) resource ID(s) that identify a participant (e.g., the participant that is selling or offering the asset); 4) zero or more display profiles to associate with this PostOrder; 5) resource IDs for a defined schedule. The PostOrder may also include additional parameters such as Side, TimeInForce (TIF), etc. The order service 514 may then be responsible for storing the PostOrder in a central database and creating and ID for that PostOrder. As noted above, the storage of such information (e.g., the creation of a new ID for a new post order and its storage) may trigger messages to be communicated over the notification bus to other components within the computer system 500. In some examples, the order service 514 may communicate directly with the matching engine 518, in others the matching engine 518 may be informed of new PostOrders via the notification bus. For example, the notification message that is communicated out over the notification bus 530 may be received by the matching engine 518 that may create an order book for the PostOrder. Concurrently, the search engine 510 may also receive the notification message and generate data for searching against the newly created PostOrder. Thus, multiple different components of the computing system 500 may act upon individual notifications for newly created resources.

Search engine 510 is a service that is responsible for handling incoming search requests and, as needed, transforming such requests into InterestOrders (e.g., if there is a single match to a search, then an InterestOrder may be generated). The search engine 510 may also be responsible for preparing a search database or dataset that will be used in connection with incoming search requests.

As discussed above, when a new resource is created, the notification bus 530 may be used to communicate a notification of such a resource to any or all of the components of computer system 500. The search engine 510 is one such component that may operate on such notifications. In response to such a notification, the search engine 510 may retrieve copy of the newly created resource, and transform or otherwise index the fields of that resource so that they are efficiently searchable. This search-optimized copy is then stored for use by the search engine 510. In some examples, the search-optimized copy is stored in database 506. In some examples, the search-optimized copy is stored in local memory of the computing device on which the search engine 510 is executing. For example, it may be stored in the memory of the same computing node in a cloud based environment that is executing the search engine 510. This search-optimized copy of the data may allow for more efficient searching of the data associated with the resources than if the database 506 where to be queried (e.g., which may not be optimized for the types of searches that will be needed). In some examples, the data store (e.g., that is local to the search engine 510) that is used may be one that is generated for ElasticSearch. Note that the search engine 510 may not index all resources. For example, display profiles may be stored in database 506. However, when notification of such is performed, the search engine 510 may treat the display profile as configuration data or the like instead of transforming into a searchable index.

As the search engine 510 may operate to index resource data, the Search engine can handle search requests in connection with such data as they are received. For example, a potential buyer of an asset may communicate a search request to search engine 510. This participant may specify desired search criteria relating to the asset(s), the seller's user profile, or order parameters, etc. For example, the searching participant may search for all PostOrders from a specific participant that offer a certain type of asset or assets. Based on such a request, the search engine 510 may query its indexed store for all PostOrders matching the searcher's criteria. The result of this initial query may then be modified based on the search engine 510 by applying any conditional display profiles named on any PostOrder in the result set. Search engine 510 may also access, for each PostOrder in the result set, any currently active conditional display profile(s) for that seller and apply the indicated conditions to each corresponding item of that seller in the initial result set. Thus, conditional display profiles that are associated with a single PostOrder may be processed as well as having conditional display profiles be processed that are associated with participants (which may have many PostOrders).

It will be appreciated that the display algorithm included with each display profile can apply to, or be based on, the searcher's user profile as well as the seller's user profile (in addition to any asset information). For example, a display algorithm may specify "Do not show any PostOrders offering asset type A to any searcher located in New York" or If a resource is of type X, then redact the price, or do not display if the industry category of the resource does not match the industry category of the searcher. Any item meeting the display algorithm's criteria is either deleted from the final result set or redacted, depending on the properties of the display criteria (e.g., one or more properties the PostOrders may be redacted rather than being completely removed from the result set). The filtered or modified result set is then returned to the participant that submitted the search request.

Returning to the components of computing system 500, match engine 518 may operate by creating new order books in response to notification that a new PostOrder has been received (e.g., via the notification bus 530). Match engine 518 may be responsible for matching, or preliminary matching, PostOrders to InterestOrders. In some examples, match engine may store, to the database 506, a match resource that identifies a match between a given PostOrder and InterestOrder. This may then be communicated via the notification bus, which may then allow other components, such as negotiation engine 520, to act upon the determination of a match.

Negotiation engine 520 is a service that may be used to handle negotiation of the match identified by the match engine 518. In such circumstances there may be additional communication with participant systems (502 & 504) that are associated with the PostOrder and InterestOrder that have been identified by the match engine 518.

Once negotiation is finalized by the negotiation engine 520, then the settlement engine 522 may handle the settlement that is associated with matching the PostOrder and the InterestOrder.

Validation service 523 is used to validate incoming data including details regarding participants, assets, orders, and other resources that are referenced with computer system 500.

Operation UI 526 provides a user interface for an operations team to directly interact with the data and components of the computer system 500. This may be provided through the Application Programming Interface (API) gateway 524 that may include operations for defining assets, reviewing orders and other types of data transaction requests and generally managing the components and services of computer system 500.

Computer system 500 may also include a database access service 508 that may allow external (or internal) applications and services to query or work with data that is stored in database 506. Examples of such external applications include reporting and machine learning (ML) applications 509.

In some examples, computer system 500 may include a plurality of different processing instances. Each of the processing instances of the computer system 500 may implement any or all of elements that are shown as part of computer system 100 or 500. For example, one processing instance may implement the search engine 510 while another, separate, processing instance may implement the asset service 512. In some examples, multiple different processing instances may be used for different versions or instances of search engine 510 (or other elements of computer system 500). Thus, for example, a first processing instance may execute search engine 510 and a second, separate, processing instance may also execute search engine 510. Such an implementation may provide for an increased ability to handle search requests.

In some examples, computer system 500 may be implemented as a distributed computer system such that any or all of the components of computer system 500 may be implemented on different computing devices within such a distributed computer system.

A distributed computing system may be composed of one or more computing nodes. In some embodiments, the one or more computing nodes may be implemented using the example computing device of FIG. 9. Each computing node includes its own computing resources (e.g., hardware components such as electronic memory or storage, input/output (I/O), hardware processors, and the like). In some embodiments, the computing nodes that comprise a distributed computing system may be referred to herein as the "computing resources" of a distributed computing system.

Each processing instance of computer system 500 may be implemented via program logic (e.g., in the form of software code, firmware, and/or hardware) that is used to process data that is stored and/or accessible by the given processing instance. The data may be stored locally in connection with the respective processing instance. For example, search engine 510 may store, in local memory that is accessible by the search engine 510, the results of a search query. These results may then be filtered based on the display criteria techniques discussed herein. In other words, the data stored in local memory may be modified by applying the display criteria thereto. Data may also be received to/from processing instances and/or transmitted onto the notification bus 530, database access bus 528, and/or to external systems (e.g., participant computer systems) as described. In some embodiments, two or more processing instances may be executed on the same computing node. In some embodiments, the two or more processing instances may be executed by the same processor or on the same core of a multi-core processor. In such cases, the processing instances may share the on-chip cache memory for faster processing.

Each of these various processing instances may be implemented in different ways—e.g., to take into account design considerations of a distributed computing system and/or the task(s) a given processing instance is designed to perform. For example, in some embodiments, one or more processing instances may be implemented in the form of a software application (e.g., an .exe or a daemon computer process) that, when instantiated and executed, runs with its own computer process space using the underlying computing resources (e.g., processor(s), memories, and/or other hardware resources) of the distributed computing system 100. Alternatively or additionally, in some embodiments, different ones of the processing instances may be different threads or other sub-processes within a given computer process. In some embodiments, each, any, or all of the processing instances may be implemented by using a virtualized container or more full virtualized system. For example, each processing instance may be its own Docker container. Each virtual container may include program logic that, when executed, carries out the tasks associated with that specific processing instance. Alternatively or additionally, in some embodiments, each, any, or all of the processing instances may be implemented as field programmable gate arrays (FPGAs) or Application Specific Integrated Circuits (ASICs). Alternatively or additionally, in some embodiments, a variety of the various approaches noted above for implementing these processing instances may be used; e.g., one processing instance may be implemented using a Docker container, another may be implemented as a software application that is running in a non-virtualized environment, and another may be implemented in the form of an FPGA. Accordingly, the techniques herein may be flexibly employed depending on the needs of a particular implementation.

Figure 7B:
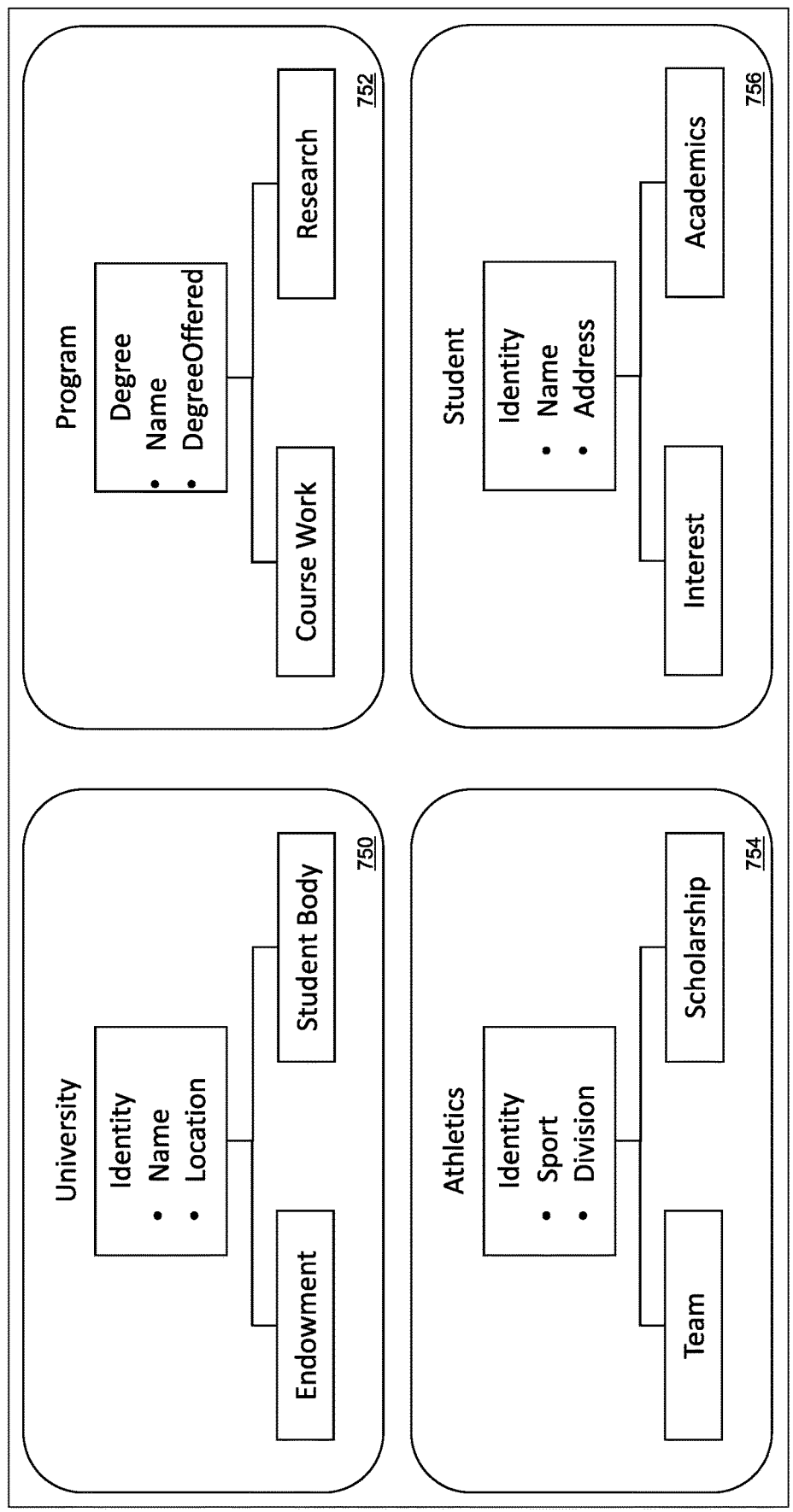
Figure 7C:
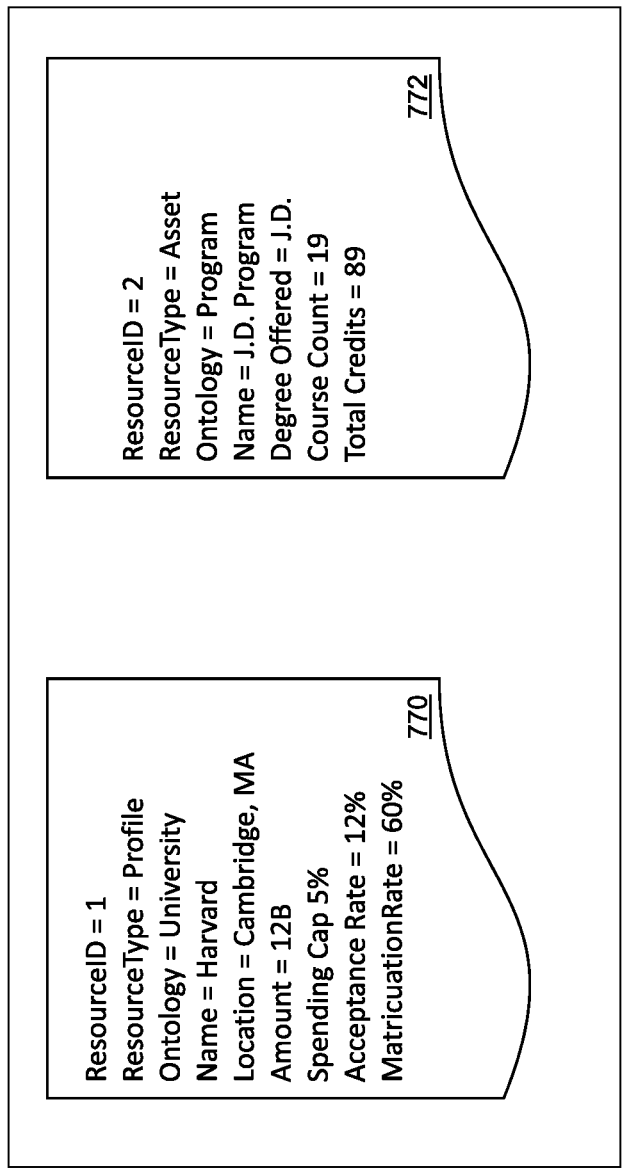

Description of FIGS. 6-7C

FIGS. 6-7C are diagrams of how aspects of a data model that may be used in connection with certain example embodiments described herein. In some examples, the data model shown in FIG. 6 describes how data may be stored and/or organized within computer system 500. For example, the data model may define the fundamental data objects that are used within computer system 500 are stored. The data model described herein provides for a common baseline to support a large variety of use cases and/or different types of markets or electronic exchange platforms. For example, while participants, tradable assets, schedules and contracts, and the like may be used in many different types of implementations, the nature and content of each of these can vary greatly. Thus, in certain examples, the data model is based on ontologies and resources. This allows each implementation (e.g., each market) to be defined in accordance with the particular requirements needed for such an implementation.

Thus, one implementation can have one set of data objects based on the illustrative data model shown in FIG. 6, and another, different implementation, can have another, differently defined set of data objects that is also based on the data model shown in FIG. 6. Each of the implementations may define their own data objects, while at the same time adhering to the same underlying data model.

In some example embodiments, there are four different data objects that are defined within the base data model. Referring to FIG. 6, these include Ontologies (e.g., 608, 612, and 624), Resources (e.g., 606, 610, and 622), Exchange Units (e.g., 602 and 620), and Relationships (e.g., 604).

Ontologies as shown in further detail in FIGS. 7A-7B and are used to define the properties that will be used describe how the data objects may be used in a given implementation. Specifically, an ontology defines a set of data elements, organized into a hierarchy of domains. FIG. 7A illustrates two different examples of how different ontologies may be defined. Data elements (Data Element 1, Data Element 2, etc.) include the various properties (e.g., Property 1, Property 2, etc.) used to describe what aspects will be included for a data object that is based on a given ontology. Domains may then be used to group together related data elements. The overall hierarchy of domains and the contents thereof forms an ontology.

An example group of ontologies used in a university example is shown in FIG. 7B. In this example, the ontologies relate to allowing Universities (e.g., which may correspond to sellers) to post degree and program/athletic scholarship packages. Prospective students (e.g., buyers) can then express interest in the various offerings depending on their academic and/or athletic goals.

The example shown in FIG. 7B includes four different example ontologies taken from such an implementation. A first ontology 750 describes an ontology structure for universities, a second 752 describes a structure for programs offered by universities, a third 754 describes a structure for athletics offered by universities, and a fourth 756 describes a structure for students. Each of these ontologies includes multiple different data elements, each of which may have multiple different properties. For example, the endowment data element of the university ontology may include the amount and spending cap, while the academics data element of the student ontology may include High School GPA and an SAT score. The other data elements may include other types of properties depending on the particular needs of a given implementation.

Turning to FIG. 7C, while ontologies define particular data elements that are then used to describe data objects, resources are the data objects themselves. In the example shown in FIG. 7C, every resource has a type and a reference to the specific ontology that is used to define the data object's properties. Example types include Asset (e.g., that describes a resource being offered), Profile (e.g., that describes a resource that is offering the asset), and the like. In other words a resource is an instance of the data object defined by the given ontology. Example resources 770 and 772 in FIG. 7C show resources that are instances of the University and Program ontologies shown in FIG. 7B. Each resource is assigned a unique identifier (1 for resource 770 and 2 for resource 772) so as to distinguish between other resources that are tracked within system 500 and other resources that are of the same ontology. Additional properties of the respective ontologies are then also included into the resource (e.g., total credits or acceptance rate, etc.).

Returning to FIG. 6, multiple ontologies (608, 612, and 624) are shown that each correspond to an instantiated resource (606, 610, and 622 respectively). The defined resources are then used to create an exchange unit data object (e.g., 602 and 620). The exchange unit shown in FIG. 6 correspond to the Post and Interest Orders discussed elsewhere herein.

Exchange Units each have a unique identifier (e.g., 1234 or 5678). Exchange units act as a container or holder of resources and may have, in addition to the above unique ID, the following characteristics: 1) can contain multiple resources, 2) a given resource can be reused or appear in connection with multiple different exchange units, 3) in some examples, each resource for a given exchange unit is included by reference (e.g., by including the ID for the given resource, 4) will define a type.

While multiple different types (e.g., greater than 2) of exchange units may be supported in certain examples, PostOrder and InterestOrders are used in connection with the Example shown in FIG. 6. The PostOrder type can be used to represent a bundle of resources intended to be offered on computer system 500, while InterestOrder types are used for exchange units that represent buyers or seekers of PostOrders.

In some examples, when a participant seller creates a PostOrder exchange unit, the system 500 creates an exchange unit of type PostOrder on behalf of that participant. This created exchange unit references all the resources included in the post (one of which may be the profile resource for the submitting the participant). Similarly, when a participant creates an InterestOrder, system 500 creates an exchange unit of type InterestOrder on behalf of that participant. This exchange unit may then be associated with a reference to the PostOrder exchange unit in which the buyer is interested. This association may take the form of storing the created interest order in an order book 600 data structure. Thus, for example, exchange unit 1 602 is placed into the order book 600 on the "sell" side of the order book, while exchange unit 604 is placed into the order book 600 on the "buy" side of the order book 600. In this manner, the two exchange units may be associated with one another.

Figure 8:
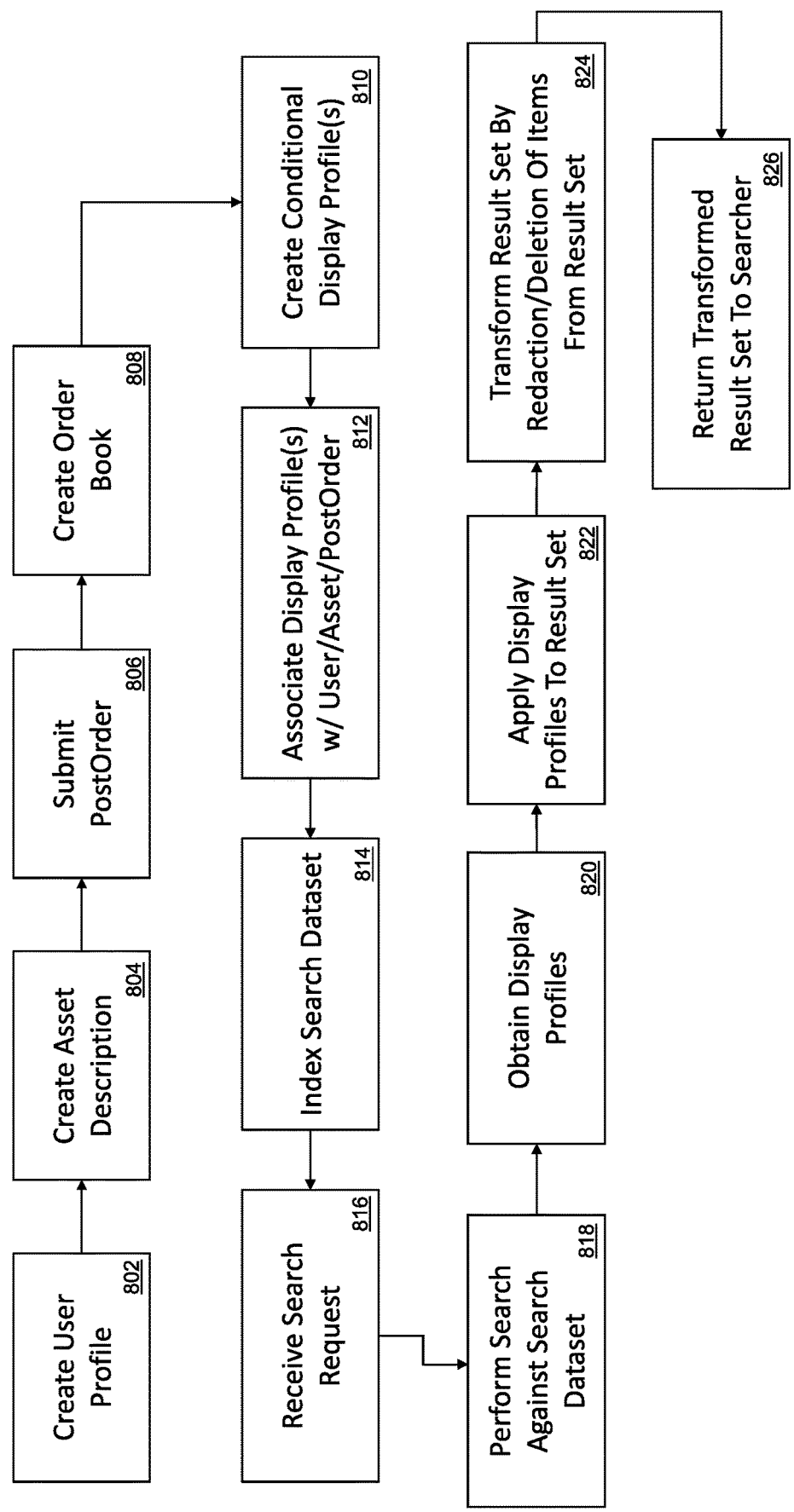
FIG. 8 is a flow chart showing an example process that may be implemented in conjunction with the system shown in FIG. 5.

Description of FIG. 8

FIG. 8 is a flow chart showing an example process that may be implemented in conjunction with the system shown in FIG. 5. The flow chart is discussed in conjunction with the various elements shown in the computer system of FIG. 5. However, it will be appreciated that the functionality discussed in connection with FIG. 8 may be applied in other contexts that do not necessarily include any or all of the elements of the computer system of FIG. 5.

At 802, participants are established in the system. This involves assigning a unique participant ID and then loading a participant profile resource into the system that describes that participant. The participant profile resource contains descriptive information about the participant such as a name, address, country, type, industry, etc. When participant profile resources are entered in the system, they are assigned reference IDs and stored in the central database (e.g., 506). Once stored to the database, then the notification bus 530 may be used to notify the components of the system that a new participant resource has been created.

At 804, participants wishing to sell assets create descriptions for those asset resources. Asset resources may include such information as asset type, physical properties, location, quantity, and the like. When an asset resource is loaded into the system, it is assigned a resource identifier and then is stored in database 506. Once stored, the notification procedure may be triggered and a notification message communicated out over the notification bus 530 to notify the components of computer system that a new asset resource has been created.

It will be appreciated, that the creation of participant profiles and asset descriptions may be preceded by the creation of ontologies for those resources.

At 806, a participant may submit a PostOrder (e.g., to offer a defined asset for sale or potential matching). This is performed via the Order Service 514. In some examples, the PostOrder is created upon reception of the necessary details regarding the PostOrder. For example, a participant may submit a data transaction request that specifies: 1) A list of resource reference IDs that identify the assets included in the order; 2) A resource reference ID that identifies the user profile resource describing the selling user; 3) Resource reference IDs that identify conditional display profiles for this PostOrder; and 4) parameters for the PostOrder. The PostOrder is created within the system when saved to a central data store (e.g., database 506) and an ID for the PostOrder has been created. Once stored, the notification process is performed using the notification bus.

At 808, the matching engine 518 may receive the notification message communicated over the notification bus concerning the creation of the new PostOrder and process this by creating a new order book (a data structure) that will hold the PostOrder and any InterestOrders that are submitted.

At 810, display profiles are created and at 812 the display profiles may be associated with any one of the different types of resources and thus may be linked to Assets, Participants (e.g. users), and/or PostOrders. In some examples, a participant may select a previously defined display profile and associate with a resource. In some examples, this process at 812 may be performed in conjunction with submission of a PostOrder at 806.

At 814, the search engine 810 receives the notification that a new PostOrder has been created (e.g., the same notification that the matching engine received). In response to this message, data regarding the PostOrder is indexed into a search database. The specific nature of the indexing that is performed may vary based on application need, but may allow for faster searching among the various properties of all of the PostOrders (and other resources) that are available within the system. As noted herein, this search index (a database or data store) may be different from where the PostOrder is stored (e.g., in database 506) and may be configured to searching as opposed to conventional data storage.

At 816, a search request is received from a participant via the search engine 510 (which may also be called a search service). In some examples, the search engine 510 may acquire or annotate the search request with additional data based on the contents of the search request. In general, each received search request may include attributes that have been expressly defined by the search (e.g., in connection with what the searcher is search for) and attributes that are annotated in connection with the participant performing the search or some other property. An example of this may be the location of the participant (e.g., the state they live in, etc.). In such a case, the geographic location of the participant that is performing the search may be added as an attribute to the search request. Thus, the search request may include a plurality of different attributes, some of which are provided by the searching participant, and some of which are automatically added by the system.

At 818, the search engine performs a search, based on the search request, against the search dataset and retrieves a preliminary result set (also called an initial search result dataset). For example, the search engine may generate a search query that is based on the search request and use that query to retrieve the preliminary result set.

At 820, display profiles associated with the preliminary result set may be obtained. This may include retrieving any display profiles associated with participants that own a given PostOrder or asset included in the preliminary result set and/or the display profiles that are associated with PostOrder's retrieved from the result set. In other words, display profiles may be obtained based on results that are included in the preliminary result set.

At 822, the retrieved display profiles are then executed against the preliminary result set to determine how the preliminary result set is to be changed. As noted above, the display profiles may operate such that when the conditional statement in the display profile evaluates to the true, then the indicated record with the result set is modified and/or completely removed. An example of a modification may be to delete those records related to athletic scholarships from the preliminary result set if the interests of a student do not include sports. Or to only show universities that are in the same location as the student. In other situations certain characteristics of a given record may be reacted from the result set. For example, price or tuition cost may be reacted if the student performing the search did not indicate a tuition range or the like.

In certain examples, the attributes that are included in the search request may be used as input for the various algorithms or conditions included in the display profiles.

In any event, at 824, the preliminary result set may be transformed into the final result set (e.g., the finalized search result dataset) that is then communicated back to the search requestor at 826.

Figure 9:
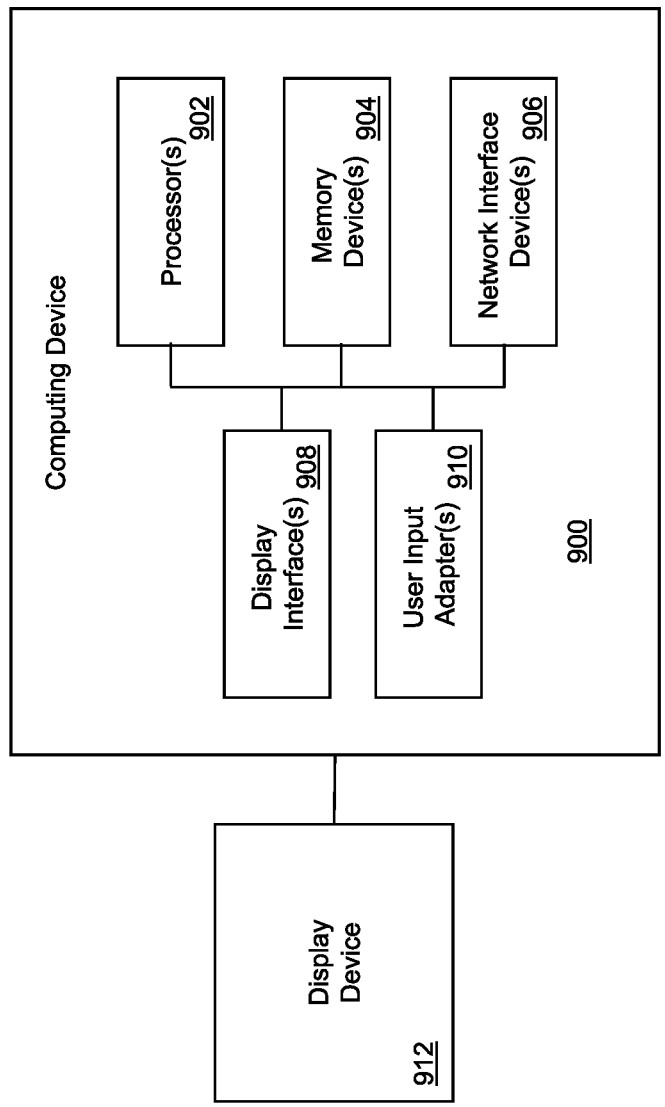
FIG. 9 shows an example computing device that may be used in some embodiments to implement features described herein.

Description of FIG. 9

FIG. 9 is a block diagram of an example computing device 900 (which may also be referred to, for example, as a "computing device," "computer system," or "computing system") according to some embodiments. In some embodiments, the computing device 900 includes one or more of the following: one or more processors 902; one or more memory devices 904; one or more network interface devices 906; one or more display interfaces 908; and one or more user input adapters 910. Additionally, in some embodiments, the computing device 900 is connected to or includes a display device 912. As will explained below, these elements (e.g., the processors 902, memory devices 904, network interface devices 906, display interfaces 908, user input adapters 910, display device 912) are hardware devices (for example, electronic circuits or combinations of circuits) that are configured to perform various different functions for the computing device 900.

In some embodiments, each or any of the processors 902 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 902 uses an instruction set architecture such as x86 or Advanced RISC Machine (ARM).

In some embodiments, each or any of the memory devices 904 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 902). Memory devices 904 are examples of non-volatile computer-readable storage media. Memory devices 904 that are located within the computing device 900 may be called local memory and distinguished from memory that is externally accessible in that access to local memory does not require communicating with other computing device via the network interface devices 906.

In some embodiments, each or any of the network interface devices 906 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 908 is or includes one or more circuits that receive data from the processors 902, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 912, which displays the image data. Alternatively or additionally, in some embodiments, each or any of the display interfaces 908 is or includes, for example, a video card, video adapter, or graphics processing unit (GPU).

In some embodiments, each or any of the user input adapters 910 is or includes one or more circuits that receive and process user input data from one or more user input devices (not shown in FIG. 9) that are included in, attached to, or otherwise in communication with the computing device 900, and that output data based on the received input data to the processors 902. Alternatively or additionally, in some embodiments each or any of the user input adapters 910 is or includes, for example, a PS/2 interface, a USB interface, a touchscreen controller, or the like; and/or the user input adapters 910 facilitates input from user input devices (not shown in FIG. 9) such as, for example, a keyboard, mouse, trackpad, touchscreen, etc.

In some embodiments, the display device 912 may be a Liquid Crystal Display (LCD) display, Light Emitting Diode (LED) display, or other type of display device. In embodiments where the display device 912 is a component of the computing device 900 (e.g., the computing device and the display device are included in a unified housing), the display device 912 may be a touchscreen display or non-touchscreen display. In embodiments where the display device 912 is connected to the computing device 900 (e.g., is external to the computing device 900 and communicates with the computing device 900 via a wire and/or via wireless communication technology), the display device 912 is, for example, an external monitor, projector, television, display screen, etc.

In various embodiments, the computing device 900 includes one, or two, or three, four, or more of each or any of the above-mentioned elements (e.g., the processors 902, memory devices 904, network interface devices 906, display interfaces 908, and user input adapters 910). Alternatively or additionally, in some embodiments, the computing device 900 includes one or more of: a processing system that includes the processors 902; a memory or storage system that includes the memory devices 904; and a network interface system that includes the network interface devices 906.

The computing device 900 may be arranged, in various embodiments, in many different ways. As just one example, the computing device 900 may be arranged such that the processors 902 include: a multi (or single)-core processor; a first network interface device (which implements, for example, WiFi, Bluetooth, NFC, etc.) a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 900 may be arranged such that: the processors 902 include two, three, four, five, or more multi-core processors; the network interface devices 906 include a first network interface device that implements Ethernet and a second network interface device that implements WiFi and/or Bluetooth; and the memory devices 904 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the search engine 102, match engine 104, computing systems 100, 110 and 108, database 106, database 506, search engine 510, asset service 512, Post/Order Service 514, Ontology Service 516, and match engine 518, each of which will be referred to individually for clarity as a "component" for the remainder of this paragraph, are implemented using an example of the computing device 900 of FIG. 9. In such embodiments, the following applies for each component: (a) the elements of the 900 computing device 900 shown in FIG. 9 (i.e., the one or more processors 902, one or more memory devices 904, one or more network interface devices 906, one or more display interfaces 908, and one or more user input adapters 910), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 904 (e.g., in various embodiments, in a volatile memory device such as a RAM or an instruction register and/or in a non-volatile memory device such as a flash memory or hard disk) and all actions described herein as performed by the software modules are performed by the processors 902 in conjunction with, as appropriate, the other elements in and/or connected to the computing device 900 (i.e., the network interface devices 906, display interfaces 908, user input adapters 910, and/or display device 912); (c) alternatively or additionally, to the extent it is described herein that the component processes and/or otherwise handles data, in some embodiments, such data is stored in the memory devices 904 (e.g., in some embodiments, in a volatile memory device such as a RAM and/or in a non-volatile memory device such as a flash memory or hard disk) and/or is processed/handled by the processors 902 in conjunction, as appropriate, the other elements in and/or connected to the computing device 900 (i.e., the network interface devices 906, display interfaces 908, user input adapters 910, and/or display device 912); (d) alternatively or additionally, in some embodiments, the memory devices 902 store instructions that, when executed by the processors 902, cause the processors 902 to perform, in conjunction with, as appropriate, the other elements in and/or connected to the computing device 900 (i.e., the memory devices 904, network interface devices 906, display interfaces 908, user input adapters 910, and/or display device 912), each or any combination of actions described herein as performed by the component and/or by any software modules described herein as included within the component.

The hardware configurations shown in FIG. 9 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 9, (e) via other hardware arrangements, architectures, and configurations, and/or via combinations of the technology described in (a) through (e).

Technical Advantages of Described Subject Matter

The techniques herein allow for a more flexible search response to be provided depending on application need. This technique allows for data providers to better control how the data they provide will be shown to requesting searchers.

In certain example embodiments, the search results may be further filtered or tailored based on who the search requestor is and what type of search they are conducting. For example, the search engine may be programmed to respond differently to searches that are generic than those that are specific. These techniques thus provide for an improved search engine within the technical area of digital search techniques.

In certain example embodiments, the data model described herein allows for a common data model solution that can support multiple different types of implementations that may have different (perhaps significantly so) needs in terms of data descriptions, properties and the like. The data objects that used in various different implementation can then be allowed to vary according to the needs of the individual implementation without requiring bespoke functionality to be created for the corresponding implementation a given system. For example, user profiles can be different across different types of implementations depending on the type of participant that would be involved in such an implementation. For example, the user profile information of a person seeking to be matched with a university degree is vastly different than the user profile a person seeking a place for dinner. Similarly, assets that are involved across different implementations can vastly vary depending on the particular implementation. The data objects that represent such asset can therefore be defined by using the described ontologies that may be defined by those offering the assets (e.g., restaurants, universities, etc.).

A technical advantage of treating all participant-defined data objects (or all data objects) as general resources defined by their respective ontologies is that this can allow the implementing system to provide a common search function or service that can access any and all of resources that have been defined within the system—regardless of their type, quantity, or structure. This type of data-driven architecture can thus facilitate a flexible, reusable, and broadly applicable system that can implemented across many different types of domains.

The distributed architecture described herein allows for decoupling of the search processing from the handling performed for orders, while at the same time maintaining speed and efficiency of the overall system. The flexibility and extensibility of the distributed architecture is provided by using the notification bus and distributed processing instances that each carry out different tasks.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-8, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system comprising:
a plurality of computing devices that communicate by using an electronic data network, each of the plurality of computing devices including at least one hardware processor;
a data store configured to store:
a plurality of data transaction requests,
a plurality of conditional display profiles, and
a search database that includes a plurality of resource records, with each of the plurality of resource records associated with at least one of the plurality of conditional display profiles, wherein each of the plurality of conditional display profiles specify one or more display conditions under which data of a corresponding record of the plurality of resource records is included into a result dataset for a search request;
the plurality of computing devices configured to execute, across different ones of the plurality of computing devices, a plurality of processing instances, the plurality of processing instances including a first processing instance and a second processing instance;
the first processing instance comprising instructions that, when executed by at least one hardware processor of the plurality of computing devices, cause the at least one hardware processor of the plurality of computing devices to perform operations comprising processing a submitted data transaction request that is associated with at least one resource and a first participant;
the second processing instance comprising instructions that, when executed by at least one hardware processor of the plurality of computing devices, cause the at least one hardware processor of the plurality of computing devices to perform operations comprising:

receiving, from an external computing system, a search request that is associated with a second participant, the search request being associated with one or more attributes;

performing, based on the search request, a search query that retrieves, from the search database, an initial search result dataset that includes a plurality of search result records;

obtaining multiple different conditional display profiles, where at least one of the plurality of conditional display profiles is obtained for each respective search result record of the plurality of search result records that is included in the initial search result dataset;

processing each respective one of the multiple different conditional display profiles by using at least one of the one or more attributes from the search request as input to evaluate the one or more display conditions of the respective one of the multiple different conditional display profiles of at least one of the plurality of conditional display profiles;

based on the processing of the multiple different conditional display profiles, modifying the initial search result dataset to create a finalized search result dataset, wherein the evaluation of the one or more display conditions of each respective one of the multiple different condition display profiles determines data of the corresponding record of plurality of resources records that is included into the finalized search result dataset; and communicating the finalized search result dataset back to the external computing system.

2. The computer system of claim 1, wherein the modifying includes removing one or more matches from the initial search result dataset based on the processing of the at least one of the plurality of conditional display profiles.

3. The computer system of claim 1, wherein the modifying includes modifying at least one parameter of one or more matches from the initial search result dataset based on the processing of the at least one of the plurality of conditional display profiles.

4. The computer system of claim 3, wherein modification of the at least one parameter includes removing the parameter from the result set.

5. The computer system of claim 1, wherein the at least one of the plurality of conditional display profiles is associated with the first participant and is applied to all results in the initial search result dataset that are associated with the first participant.

6. The computer system of claim 1, wherein the at least one of the plurality of conditional display profiles is associated with a first result in the initial search result dataset and is only applied to modify or delete the first result from the initial search result dataset.

7. The computer system of claim 1, wherein the search database is stored in non-transitory memory of one of the plurality of computing devices; and a resource data store, which is separate from the search database, that is stored in non-transitory memory of one of the plurality of computing devices, the second processing instance comprises further instructions that, when executed by at least one hardware processor of the plurality of computing devices, cause the at least one hardware processor of the plurality of computing devices to perform operations comprising:

receiving a notification that a new resource has been added to the resource data store, and adding search data for the new resource that has been added to the search database.

8. The computer system of claim 7, wherein the search database is stored locally in memory of a computing device that is performing the operations of the second processing instance.

9. The computer system of claim 1, wherein only those attributes that are included in the search request are included among the attributes that are included in the finalized search result dataset.

10. The computer system of claim 1, wherein a third processing instance of the plurality of processing instances comprises instructions that, when executed by at least one hardware processor of the plurality of computing devices, cause the at least one hardware processor of the plurality of computing devices to perform operations comprising:

receiving one or more ontology definitions and storing the one or more ontology definitions to the data store; and receiving one or more resource definitions that each define a separate resource that is tracked with the computer system, wherein each separate resource must comply with any of the ontology definitions stored in the data store, wherein the submitted data transaction request includes reference to a plurality of different resources.

11. The computer system of claim 1, wherein the electronic data network includes a notification bus that is configured to communicate, upon completion of storage of a new resource to the data store, notifications regarding the new resource to the plurality of processing instances.

12. The computer system of claim 11, wherein multiple different processing instances carry out processing based on notifications regarding creation of a new resource.

13. A method of processing search requests in a distributed computing environment that includes a plurality of computing devices that communicate by using an electronic data network, each of the plurality of computing devices including at least one hardware processor, the method comprising:

storing a plurality of data transaction requests and a plurality of conditional display profiles;

storing a search database that includes a plurality of resources records, with each of the plurality of resources records associated with at least one of the plurality of conditional display profiles, wherein each of the plurality of conditional display profiles specify one or more display conditions under which data of a corresponding record of plurality of resources records is included into a result dataset for a search request;

executing, across different ones of the plurality of computing devices, a plurality of processing instances, the plurality of processing instances including a first processing instance and a second processing instance;

processing a submitted data transaction request that is associated with at least one resource and a first participant;

receiving, from an external computing system, a search request that is associated with a second participant, the search request being associated with one or more attributes;

performing, based on the search request, a search query that retrieves, from the search database, an initial search result dataset that includes a plurality of search result records;

obtaining multiple different conditional display profiles, where at least one of the plurality of conditional display profiles is obtained for each respective search result record of the plurality of search result records that is included in the initial search result dataset;

processing each respective one of the multiple different conditional display profiles by using at least one of the one or more attributes from the search request as input to evaluate the one or more display conditions of the respective one of the multiple different conditional display profiles of at least one of the plurality of conditional display profiles;

based on the processing of the multiple different conditional display profiles, modifying the initial search result dataset to create a finalized search result dataset, wherein the evaluation of the one or more display conditions of each respective one of the multiple different condition display profiles determines data of the corresponding record of plurality of resources records that is included into the finalized search result dataset; and communicating the finalized search result dataset back to the external computing system.

14. The method of claim 13, wherein the modifying includes removing one or more matches from the initial search result dataset based on the processing of the at least one of the plurality of conditional display profiles.

15. The method of claim 13, wherein the modifying includes modifying at least one parameter of one or more matches from the initial search result dataset based on the processing of the at least one of the plurality of conditional display profiles.

16. The method of claim 15, wherein modification of the at least one parameter includes removing the parameter from the result set.

17. The method of claim 13, wherein the at least one of the plurality of conditional display profiles is associated with the first participant and is applied to all results in the initial search result dataset that are associated with the first participant.

18. The method of claim 13, wherein the at least one of the plurality of conditional display profiles is associated with a first result in the initial search result dataset and is only applied to modify or delete the first result from the initial search result dataset.

19. The method of claim 13, further comprising:
receiving one or more ontology definitions and storing the one or more ontology definitions to the data store; and
receiving one or more resource definitions that each define a separate resource that is tracked with the computer system, wherein each separate resource must comply with any of the ontology definitions stored in the data store,
wherein the submitted data transaction request includes reference to a plurality of different resources.

20. A non-transitory computer readable storage medium storing computer executable instructions, the computer executable instructions comprising instructions that are configured to cause at least on hardware processor to perform operations comprising:

storing a plurality of data transaction requests and a plurality of conditional display profiles;

storing a search database that includes a plurality of resources records, with each of the plurality of resources records associated with at least one of the plurality of conditional display profiles, wherein each of the plurality of conditional display profiles specify one or more display conditions under which data of a corresponding record of plurality of resources records is included into a result dataset for a search request;

executing, across different ones of the plurality of computing devices, a plurality of processing instances, the plurality of processing instances including a first processing instance and a second processing instance;

processing a submitted data transaction request that is associated with at least one resource and a first participant;

receiving, from an external computing system, a search request that is associated with a second participant, the search request being associated with one or more attributes;

performing, based on the search request, a search query that retrieves, from the search database, an initial search result dataset that includes a plurality of search result records;

obtaining multiple different conditional display profiles, where at least one of the plurality of conditional display profiles is obtained for each respective search result record of the plurality of search result records that is included in the initial search result dataset;

processing each respective one of the multiple different conditional display profiles by using at least one of the one or more attributes from the search request as input to evaluate the one or more display conditions of the respective one of the multiple different conditional display profiles of at least one of the plurality of conditional display profiles;

based on the processing of the multiple different conditional display profiles, modifying the initial search result dataset to create a finalized search result dataset, wherein the evaluation of the one or more display conditions of each respective one of the multiple different condition display profiles determines data of the corresponding record of plurality of resource records that is included into the finalized search result dataset; and communicating the finalized search result dataset back to the external computing system.

* * * * *